United States Patent
Yokoyama et al.

(10) Patent No.: US 11,901,740 B2
(45) Date of Patent: Feb. 13, 2024

(54) MANAGEMENT SYSTEM AND METHOD OF MANAGING POWER FEED MAT

(71) Applicant: TOYOTA JIDOSHA KABUSHIKI KAISHA, Aichi-ken (JP)

(72) Inventors: Daiki Yokoyama, Gotemba (JP);
Toshiya Hashimoto, Miyoshi (JP);
Katsuya Kobayashi, Okazaki (JP);
Takahiro Hirano, Gotemba (JP);
Midori Sugiyama, Susono (JP);
Ryunosuke Yamashita, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/858,997

(22) Filed: Jul. 7, 2022

(65) Prior Publication Data
US 2023/0021709 A1    Jan. 26, 2023

(30) Foreign Application Priority Data
Jul. 13, 2021   (JP) .................................. 2021-115678

(51) Int. Cl.
*H02J 50/80* (2016.01)
*H02J 50/00* (2016.01)
*H02J 50/10* (2016.01)
*B60L 53/67* (2019.01)
*B60L 53/122* (2019.01)
*H02J 50/40* (2016.01)

(52) U.S. Cl.
CPC .......... *H02J 50/005* (2020.01); *B60L 53/122* (2019.02); *B60L 53/67* (2019.02); *H02J 50/10* (2016.02); *H02J 50/40* (2016.02); *H02J 50/80* (2016.02)

(58) Field of Classification Search
None
See application file for complete search history.

(56) References Cited

U.S. PATENT DOCUMENTS

| | | | | |
|---|---|---|---|---|
| 9,368,020 | B1* | 6/2016 | Bell | G08B 21/24 |
| 9,768,621 | B2* | 9/2017 | Lee | H02J 50/80 |
| 2021/0135468 | A1* | 5/2021 | Park | H02J 7/0048 |
| 2022/0181919 | A1* | 6/2022 | Chou | H02J 50/402 |

FOREIGN PATENT DOCUMENTS

JP   2018157686 A   10/2018

* cited by examiner

*Primary Examiner* — Daniel Kessie
(74) *Attorney, Agent, or Firm* — HAUPTMAN HAM, LLP

(57) ABSTRACT

A management system is configured to manage a power feed mat that wirelessly feeds power to a movable body. The power feed mat is configured to communicate while it is placed at a prescribed location. This management system includes a monitoring apparatus that monitors communication by the power feed mat and a processing apparatus that performs prescribed processing when the monitoring apparatus senses loss of the communication.

14 Claims, 11 Drawing Sheets

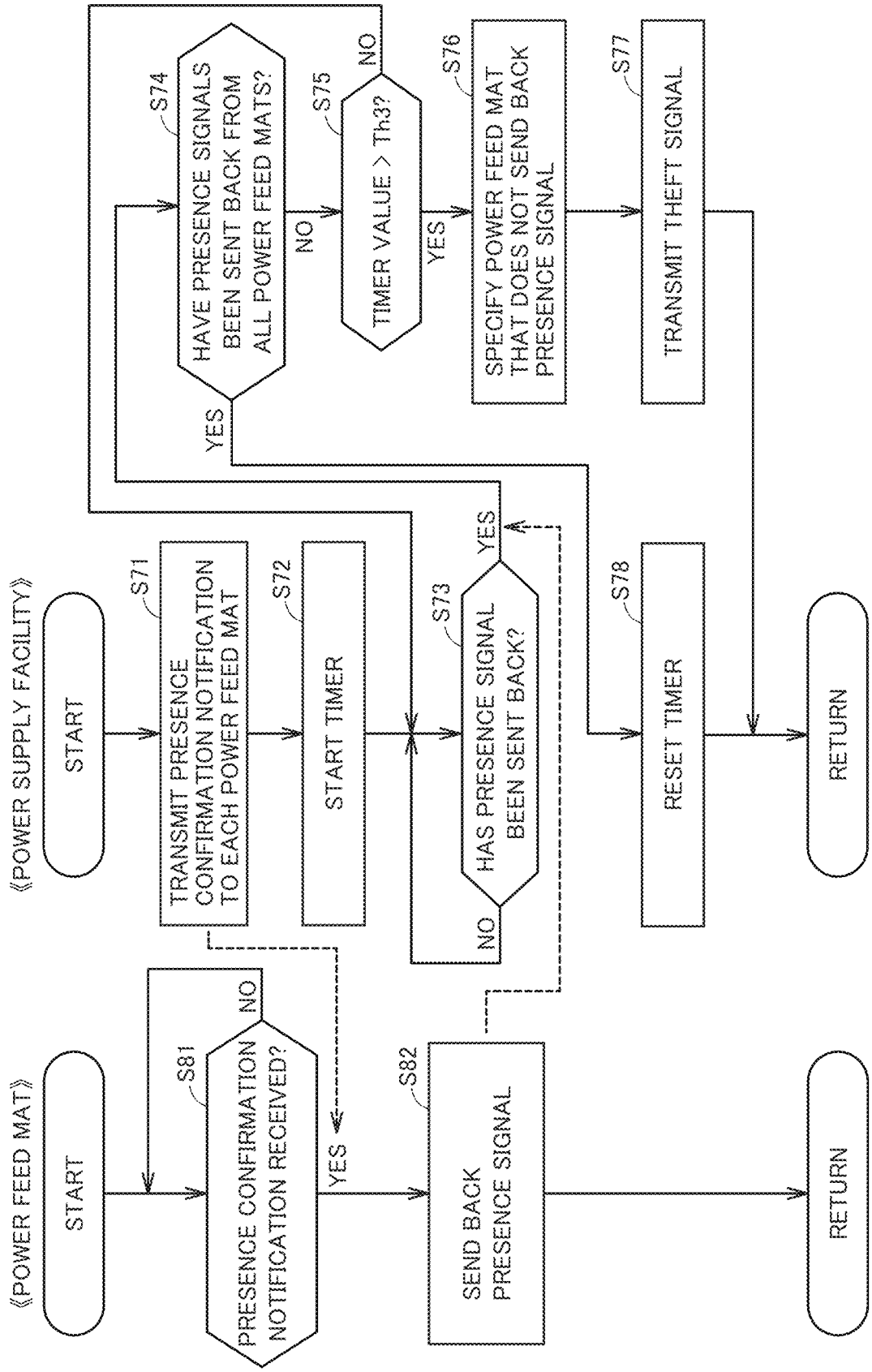

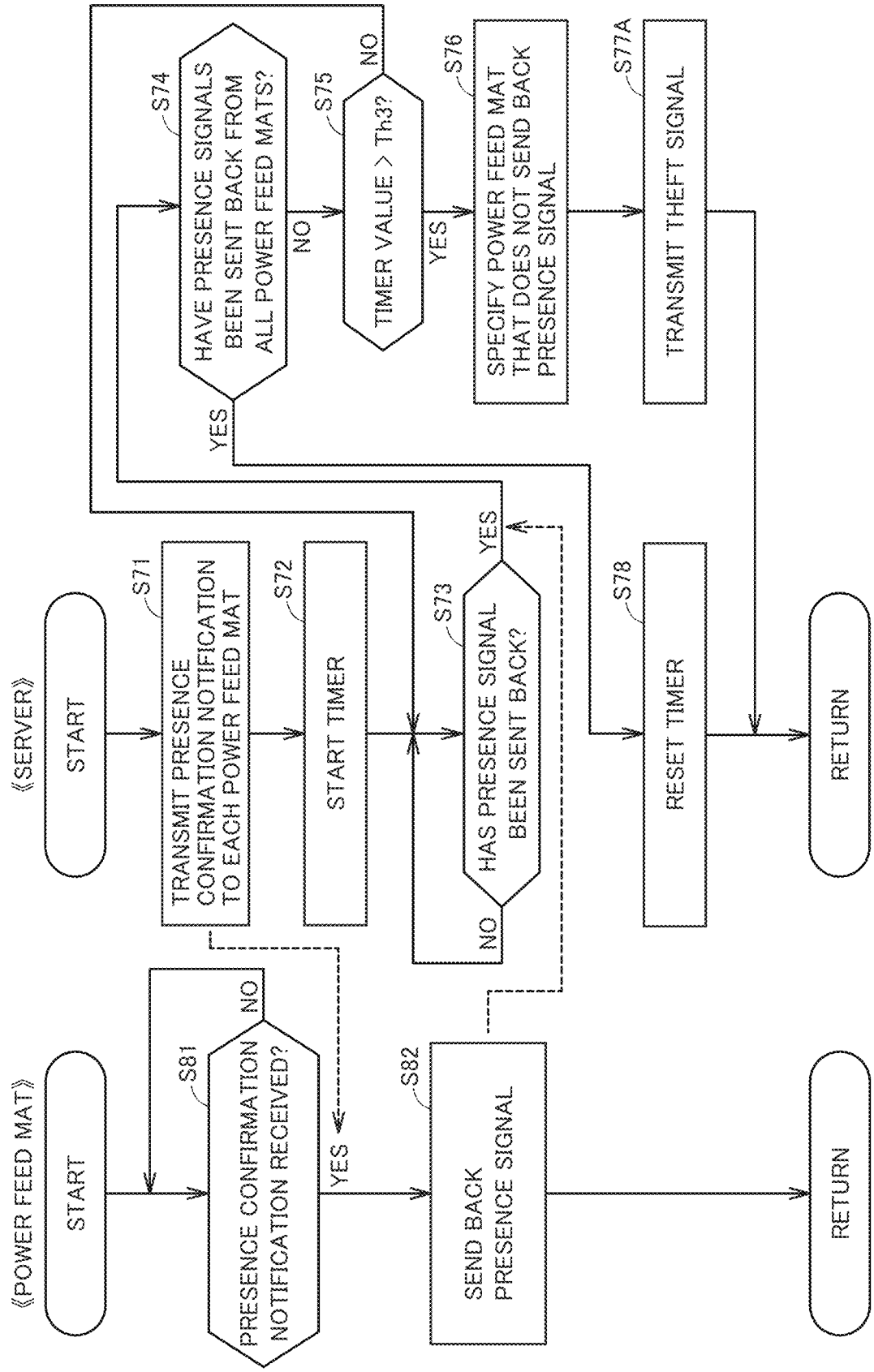

MANAGEMENT SYSTEM AND METHOD OF MANAGING POWER FEED MAT

This nonprovisional application is based on Japanese Patent Application No. 2021-115678 filed with the Japan Patent Office on Jul. 13, 2021, the entire contents of which are hereby incorporated by reference.

BACKGROUND

Field

The present disclosure relates to a management system and a method of managing a power feed mat.

Description of the Background Art

For example, according to the disclosure in Japanese Patent Laying-Open No. 2018-157686, when a vehicle that travels on a power feed lane where a plurality of power feed units are provided along a lane senses presence of a foreign matter on a road in front of a vehicle body, the vehicle transmits a signal for stopping or suppressing power feed from power feed units present within a prescribed range in front and in the rear of a point where presence of the foreign matter is sensed.

SUMMARY

The power feed units described in Japanese Patent Laying-Open No. 2018-157686 are buried in the road. Each of the plurality of power feed units includes one power transmission coil. In contrast, the inventors of the present application propose a power feed mat that can readily be placed. The power feed mat is placed, for example, on a floor or a wall, and configured to wirelessly feed power to a movable body that comes closer thereto.

A power feed mat is more readily removed after placement than the power feed unit buried in the road as described in Japanese Patent Laying-Open No. 2018-157686. Therefore, there is a concern that the power feed mat is blown away by the wind or stolen.

The present disclosure was made to solve the problem, and an object thereof is to readily and appropriately monitor a placed power feed mat.

A management system according to a first point of view of the present disclosure is configured to manage a power feed mat that wirelessly feeds power to a movable body. The power feed mat is configured to communicate while it is placed at a prescribed location. The management system includes a monitoring apparatus that monitors communication by the power feed mat and a processing apparatus that performs prescribed processing when the monitoring apparatus senses loss of the communication.

In the management system, the processing apparatus can determine whether or not the power feed mat is present at the prescribed location based on whether or not communication by the power feed mat has been lost. Specifically, when communication by the power feed mat continues, the power feed mat is considered as being present at the prescribed location. When communication by the power feed mat is lost, on the other hand, it is highly likely that the power feed mat is not present at the prescribed location. When the power feed mat has left the prescribed location, the processing apparatus can take necessary measures by performing prescribed processing.

Examples of the movable body include an uninhabited movable body (an automated guided vehicle (AGV), an agricultural machine, a walking robot, a drone, a robot cleaner, a spacecraft, and the like) and a vehicle (a car, a rail vehicle, a ship, an airplane, and the like).

The prescribed processing may include transmission by the processing apparatus, of a signal indicating loss of the communication. According to such a configuration, an external terminal (for example, a terminal of a manager of the power feed mat) can be notified that the power feed mat is not present at the prescribed location.

Any management system described above may further include an alarm device. The prescribed processing may include processing to issue an alarm by the alarm device. According to such a configuration, theft of the power feed mat can be suppressed.

The power feed mat may include a transmitter that emits a position signal indicating a position of the power feed mat. The prescribed processing may include processing to start emission of the position signal by the transmitter. According to such a configuration, theft of the power feed mat can be suppressed.

In any management system described above, each of the monitoring apparatus and the processing apparatus may be arranged within the power feed mat or in the vicinity of the power feed mat. The management system may further include a server configured to communicate with a terminal of a manager of the power feed mat. The processing apparatus may be configured to transmit a first signal to the server when the monitoring apparatus senses loss of the communication. The server may be configured to transmit, when the server receives the first signal, a second signal indicating the power feed mat having left the prescribed location, to the terminal.

According to the configuration, the manager of the power feed mat can be notified through the server that the power feed mat is not present at the prescribed location. By adopting the server as above, management of a large number of power feed mats is facilitated.

Any management system described above may further include a plurality of power feed mats including the power feed mat described above. The plurality of placed power feed mats may be configured to communicate among the power feed mats. The monitoring apparatus may be configured to monitor communication among the power feed mats.

According to the management system, the plurality of placed power feed mats can readily and appropriately be monitored. Communication among the power feed mats may be wired communication or wireless communication.

The processing apparatus may be configured to transmit a signal indicating in which of the plurality of power feed mats communication has been lost when the monitoring apparatus senses loss of communication by any one of the plurality of power feed mats.

According to the configuration, when at least one of the plurality of power feed mats is not present at the prescribed location, an external terminal (for example, the terminal of the manager of the power feed mat) can be notified of which power feed mat is not present at the prescribed location.

Each of the plurality of power feed mats may be flexible to such an extent as being rolled into a cylinder. Since such a power feed mat can be rolled into a cylinder, it can easily be carried.

Each of the plurality of power feed mats may be a rental power feed mat. Since the monitoring apparatus and the processing apparatus described previously facilitate management of rental power feed mats, establishment of a business model for renting power feed mats is facilitated.

Each of the plurality of power feed mats may include the monitoring apparatus and the processing apparatus. According to such a configuration, even if one power feed mat is distant from the prescribed location, the processing apparatus of a remaining power feed mat can perform the prescribed processing.

Any management system described above may further include a communication apparatus that communicates with the power feed mat placed at the prescribed location. The monitoring apparatus may be configured to monitor communication between the power feed mat and the communication apparatus.

According to the configuration as well, the placed power feed mat can readily and appropriately be monitored. The communication apparatus may be provided in the vicinity of the prescribed location (for example, in the ground). Alternatively, the communication apparatus may be mounted on a server provided at a location distant from the prescribed location. Communication between the power feed mat and the communication apparatus may be wired communication or wireless communication.

The communication apparatus may be mounted on a power supply facility of the power feed mat. Specifically, the power feed mat may include a plurality of power transmission coils. The management system may further include a power supply module including a power supply circuit that supplies electric power to each power transmission coil included in the power feed mat. The monitoring apparatus and the communication apparatus may be contained in the power supply module.

In the configuration, the monitoring apparatus contained in the power supply module can readily and appropriately monitor the power feed mat.

A method of managing a power feed mat according to a second point of view of the present disclosure includes monitoring communication by a power feed mat that wirelessly feeds power to a movable body and performing prescribed processing when communication by the power feed mat is lost.

According to the power feed method as well, similarly to the previously described management system, a placed power feed mat can readily and appropriately be monitored.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a flowchart showing processing performed instead of the processing shown in FIG. 6, in the management system according to the first modification.

FIG. 11 is a flowchart showing processing performed instead of the processing shown in FIGS. 6 and 7, in the management system according to a second modification.

DESCRIPTION OF THE PREFERRED EMBODIMENTS

Figure 1:
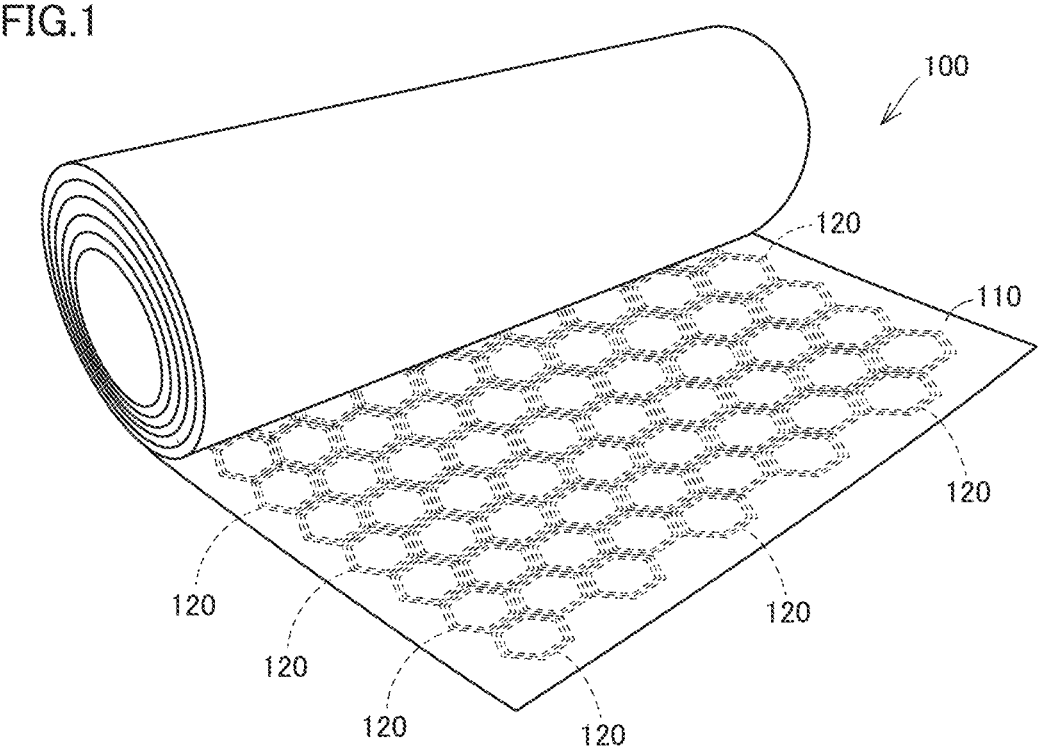
FIG. 1 is a diagram showing a power feed mat according to an embodiment of the present disclosure.

An embodiment of the present disclosure will be described in detail below with reference to the drawings. The same or corresponding elements in the drawings have the same reference characters allotted and description thereof will not be repeated.

FIG. 1 is a diagram showing a power feed mat according to this embodiment. Referring to FIG. 1, a power feed mat 100 includes a sheet substrate 110 and a plurality of power transmission coils 120 provided in the inside of sheet substrate 110. Power feed mat 100 is constructed as being portable. Power feed mat 100 has a light weight, for example, to such an extent that it can be carried by one person or several persons. A power supply facility (see FIG. 3) for power feed mat 100 which will be described later is constructed as being attachable to and removable from power feed mat 100. Power feed mat 100 is flexible to such an extent as being rolled into a cylinder. FIG. 1 shows power feed mat 100 partially rolled into a cylinder. The entire power feed mat 100 can also be rolled into a cylinder. By rolling power feed mat 100 into a cylinder, power feed mat 100 is more easily carried. Power feed mat 100 may be stored as being rolled into a cylinder. Power feed mat 100 can also be developed like a sheet. Power feed mat 100 is used as being developed (see FIG. 2 which will be described later). Power feed mat 100 can be handled as a rug. Power feed mat 100 is constructed as being placed indoors or outdoors. Power feed mat 100 may be placed in a passage (for example, an intersection of passages) indoors. Power feed mat 100 may be placed on the floor and thereafter fixed by a removable retainer (for example, retaining hardware or a gripper).

In this embodiment, power feed mat 100 in a developed state has a rectangular outer geometry (two-dimensional shape). The outer geometry of power feed mat 100 is not limited to the rectangular shape but can be modified as appropriate. Power feed mat 100 may have an outer geometry in a polygonal shape (a triangular shape, a pentagonal shape, a hexagonal shape, or the like) other than a quadrangular shape, or a circular shape. In this embodiment, a plurality of power transmission coils 120 included in power feed mat 100 are contained in sheet substrate 110. Without being limited as such, power transmission coils 120 may be provided as being exposed at a surface of power feed mat 100. Sheet substrate 110 is formed, for example, of a resin. A material for sheet substrate 110 can be modified as appropriate. Power transmission coil 120 is formed, for example, of a metal. A material for power transmission coil 120 can be modified as appropriate. Power transmission coil 120 may be formed, for example, of a conductive resin. Power feed mat 100 may include any number of power transmission coils 120. The number of power transmission coils 120 may be equal to or larger than two and smaller than ten, equal to or larger than ten and smaller than one hundred, or equal to or larger than one hundred.

In this embodiment, on a mat surface (a main surface of power feed mat 100), the plurality of power transmission coils 120 are regularly disposed in matrix of rows and columns. Power transmission coils 120 are arranged, for example, in grids. Without being limited as such, arrangement of power transmission coils 120 can be modified as appropriate. Power transmission coils 120 may irregularly be arranged. Though power transmission coil 120 is formed in a regular hexagonal shape in a plan view in an example shown in FIG. 1, a shape of power transmission coil 120 can be modified as appropriate. A two-dimensional shape of power transmission coil 120 may be a polygonal shape (for example, a quadrangular shape) other than the hexagonal shape, or a circular shape. A size of power transmission coil 120 may also be modified as appropriate in conformity with an application (for example, a structure of a movable body that uses power feed mat 100) of power feed mat 100.

Figure 2:
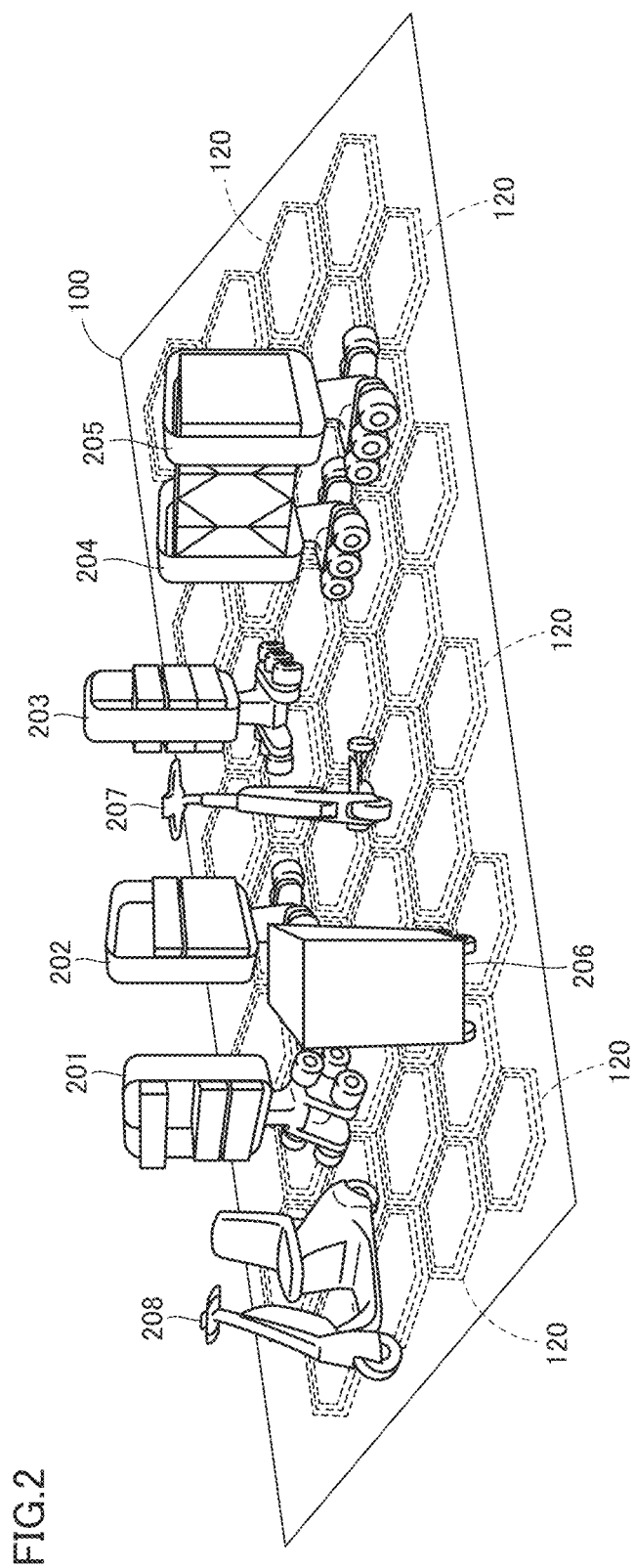
FIG. 2 is a diagram showing an exemplary state during use of the power feed mat shown in FIG. 1.

FIG. 2 is a diagram showing an exemplary state during use of power feed mat 100. In an example shown in FIG. 2, movable bodies 201 and 208 are on power feed mat 100. The plurality of power transmission coils 120 included in power feed mat 100 are configured to individually feed power to different movable bodies. Electric power is wirelessly fed to the movable body from power transmission coil 120 electromagnetically coupled to a power reception coil (secondary coil) of the movable body. Any wireless power transmission (WPT) technique may be applicable, and magnetic resonance or electromagnetic induction power transmission may be applicable. Another technique may be adopted.

Each of movable bodies 201 to 208 is a small battery electric vehicle (BEV) configured to travel indoors and outdoors. Each of movable bodies 201 to 206 is an automated guided vehicle (AGV). Each of movable bodies 207 and 208 is a single-person battery electric vehicle.

Movable bodies 201 to 205 are AGVs of the same type. Each of movable bodies 201 to 205 is used for load transport. In the example shown in FIG. 2, each of movable bodies 201 to 203 carries a load alone. Movable bodies 204 and 205 carry in cooperation, a large load that cannot be carried by one movable body. Each of movable bodies 201 to 205 is suitable for indoor transport (or transport within the premises). Each of movable bodies 201 to 205 is referred to as an "AGV 200" below unless they are described as being distinguished from one another.

Movable body 206 is an AGV with a delivery box. The delivery box may be configured to be lockable and unlockable. A particular person (for example, a person who has successfully been authenticated) alone may be able to lock or unlock the delivery box. The delivery box may be configured such that a temperature therein is adjustable. The delivery box may be a cold storage.

Each of movable bodies 207 and 208 is configured to be adapted to both of manual drive by a driver on-board and autonomous travel without human intervention. Movable body 207 includes a handlebar. Movable body 208 includes a handlebar and a seat. Each of movable bodies 207 and 208 is suitable as a vehicle that moves indoors (or within the premises).

Figure 3:
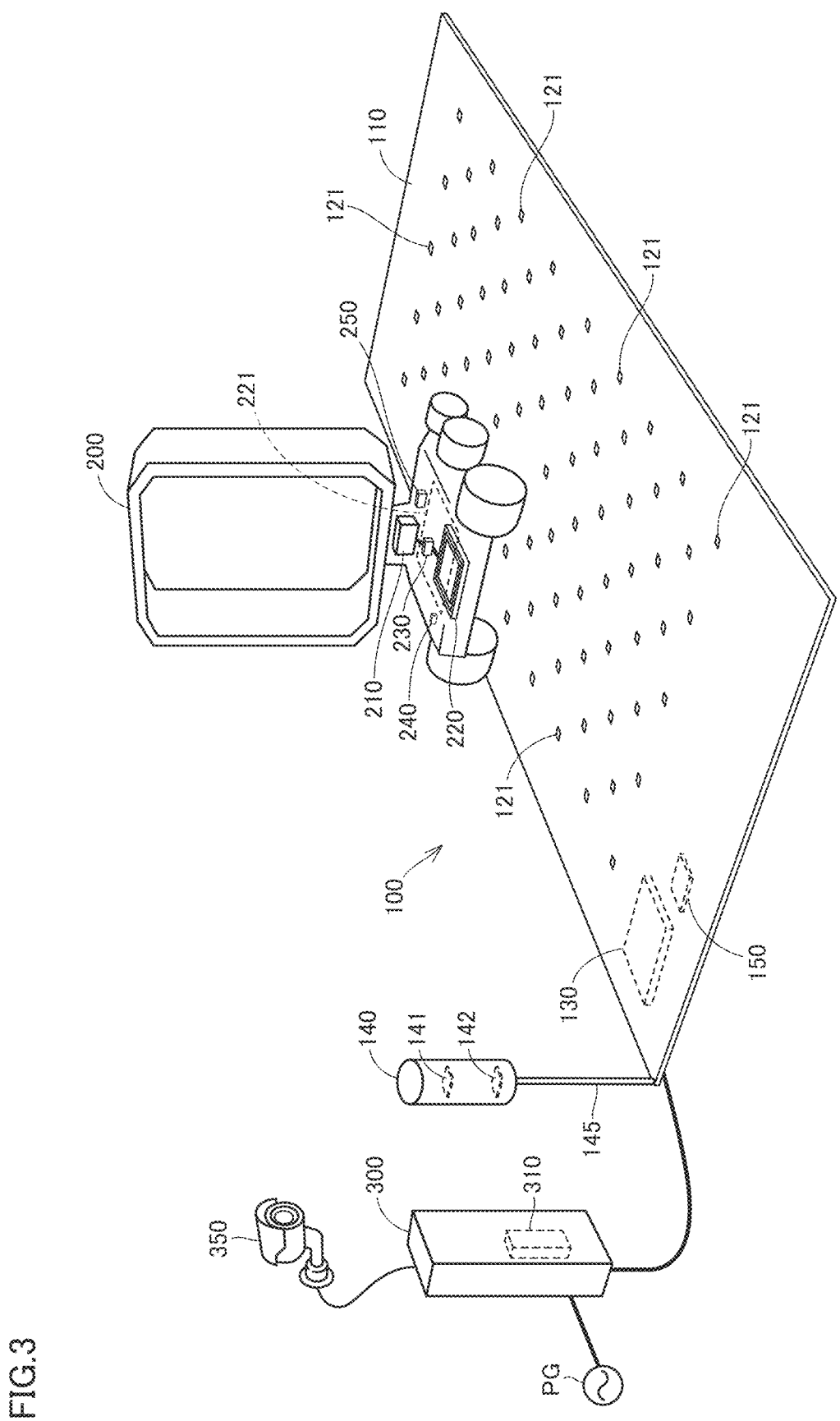
FIG. 3 is a diagram for illustrating a configuration of a movable body that uses the power feed mat according to the embodiment of the present disclosure and configurations of the power feed mat and a power supply facility thereof.

FIG. 3 is a diagram for illustrating a configuration of a movable body fed with power from power feed mat 100 and a configuration of a power supply facility of power feed mat 100. A configuration of AGV 200 will be described below by way of example of the movable body.

Referring to FIG. 3 together with FIG. 2, the power feed system according to this embodiment includes power feed mat 100, a power supply module 300, and a camera 350. Power supply module 300 corresponds to the power supply facility of power feed mat 100. Power supply module 300 is electrically connected to power feed mat 100 through a cable. Power supply module 300 includes a power supply circuit 310. Power supply circuit 310 is configured to receive supply of electric power from a power grid PG and to supply electric power to each of the plurality of power transmission coils 120 included in power feed mat 100. Power grid PG is an electric power network constructed of a power plant and a power transmission and distribution facility that are not shown. Power grid PG supplies alternating-current (AC) power (for example, three-phase AC power) to power supply module 300. Power supply circuit 310 includes a power conversion circuit. Power supply circuit 310 converts electric power supplied from power grid PG into electric power suitable for power feed mat 100 and supplies resultant electric power to power feed mat 100.

Camera 350 is configured to receive supply of electric power from power supply module 300 and to pick up an image of an area around power feed mat 100 from above power feed mat 100. Power supply module 300 includes also a power supply circuit (not shown) for camera 350 in addition to power supply circuit 310 for power feed mat 100. Camera 350 may be attached to a wall. Alternatively, a post on which camera 350 is supported may be provided. Camera 350 contains, in addition to an image pick-up element, a processor and an image processing circuit that analyze video images obtained by the image pick-up element. Camera 350 picks up an image of the entire surface of power feed mat 100 and identifies an object (a living body or a substance) present on power feed mat 100. Camera 350 monitors a state of power feed mat 100.

Power feed mat 100 further includes in the inside of sheet substrate 110, a plurality of magnetic markers 121, a power control circuit 130, and a mat controller 150 that controls power control circuit 130. A computer including a processor, a random access memory (RAM), a storage, and a communication interface (I/F) can be adopted as mat controller 150. In this embodiment, various types of control in power feed mat 100 are carried out by execution by the processor of a program stored in a storage in mat controller 150. Various types of control in power feed mat 100 are not limited to control carried out by software but can also be carried out by dedicated hardware (electronic circuitry).

Power control circuit 130 includes a connection switching circuit. This connection switching circuit is configured to receive supply of electric power from power supply circuit 310 and to switch between connection and disconnection between each power transmission coil 120 included in power feed mat 100 and power supply circuit 310. The connection switching circuit of power control circuit 130 may include a switch provided for each power transmission coil 120. In this embodiment, the connection switching circuit is a normally-off switching circuit. While mat controller 150 is in a non-operating state (including a sleep state), each power transmission coil 120 included in power feed mat 100 and power supply circuit 310 are disconnected from each other.

Power control circuit 130 further includes a power conversion circuit. This power conversion circuit is configured to apply a prescribed voltage to each power transmission coil 120 electrically connected to power supply circuit 310. Specifically, the power conversion circuit of power control circuit 130 may include a resonance circuit (for example, an LC resonance circuit), a filter circuit, an inverter, and a power factor correction (PFC) circuit. Though details will be described later, mat controller 150 controls power control circuit 130 to apply a voltage suitable for wireless power feed to power transmission coil 120 coupled to a power reception coil (secondary coil) and to apply a weak voltage to power transmission coil 120 not coupled to a power reception coil (secondary coil).

A plurality of magnetic markers 121 are provided in correspondence with the plurality of power transmission coils 120, respectively. In other words, magnetic marker 121 is provided for each power transmission coil 120 included in power feed mat 100. Magnetic marker 121 indicates a position of corresponding power transmission coil 120. By detecting magnetism emitted from magnetic marker 121 with a magnetic sensor, the movable body can detect the position of power transmission coil 120 corresponding to that magnetic marker 121.

A coordination module 140 is connected to sheet substrate 110 of power feed mat 100 with a post 145 being interposed. Coordination module 140 includes a communication instrument 141 and an alarm device 142. In the inside of post 145, a communication line through which mat controller 150 and coordination module 140 are connected to each other is provided. Mat controller 150 is configured to communicate with an apparatus on the outside of power feed mat 100 through communication instrument 141.

Power feed mat 100 is configured to communicate with another power feed mat. Communication instrument 141 includes a short-range communication instrument that can communicate with another power feed mat placed in the vicinity of power feed mat 100. When a plurality of power feed mats 100 are arranged in the vicinity of one another, communication instruments 141 of power feed mats 100 establish short-range communication such as near field communication (NFC). In this embodiment, a plurality of power feed mats 100 placed nearby wirelessly communicate with one another. The power feed mats may communicate with one another in any communication method, and wired communication may be applicable. Alarm device 142 is configured to issue an alarm when prescribed communication (in this embodiment, communication with another power feed mat placed in the vicinity of power feed mat 100) by power feed mat 100 is lost. Alarm device 142 is implemented, for example, by a buzzer. Mat controller 150 controls alarm device 142.

Though details will be described later, communication instrument 141 further includes a wireless communication instrument that can communicate with AGV 200.

In the inside of a cable through which power feed mat 100 and power supply module 300 are connected to each other, not only a power line but also a communication line is provided. In this embodiment, power feed mat 100 and power supply module 300 are configured to communicate with each other. Mat controller 150 is configured to control power supply circuit 310 in power supply module 300. Camera 350 is communicatively connected to power feed mat 100 with power supply module 300 being interposed. Information obtained by camera 350 is provided to mat controller 150 through power supply module 300.

AGV 200 includes a battery 210, a power reception coil 220 that wirelessly receives electric power from power transmission coil 120, a charging circuit 230 that charges battery 210 with electric power received by power reception coil 220, a wireless communication instrument 240, and an electronic control unit (ECU) 250 that controls charging circuit 230.

A known power storage for a vehicle (for example, a liquid secondary battery, an all-solid secondary battery, or a battery assembly) can be adopted as battery 210. Examples of the secondary battery for the vehicle include a lithium ion battery and a nickel metal hydride battery. Instead of the secondary battery, another power storage such as an electric double layer capacitor may be adopted. Charging circuit 230 functions as a vehicle-mounted charger of battery 210. A computer including a processor, a RAM, a storage, and a communication I/F can be adopted as ECU 250. In this embodiment, various types of control in AGV 200 are carried out by execution by the processor of a program stored in the storage in ECU 250. Various types of control in AGV 200 are not limited to control carried out by software but can also be carried out by dedicated hardware (electronic circuitry).

AGV 200 is an autonomous vehicle configured to travel with electric power stored in battery 210 without human intervention. Though not shown, AGV 200 further includes an electric motor, a battery management system (BMS), an autonomous driving sensor, and a navigation system including map information. AGV 200 travels with motive power generated by the electric motor by supply of electric power to the electric motor from battery 210. The BMS includes various sensors that detect a state (for example, a current, a voltage, and a temperature) of battery 210 and a result of detection is provided to ECU 250. For example, the BMS detects charging power (a charging current and a charging voltage) of battery 210. The BMS estimates a state of charge (SOC) of battery 210 and a result of estimation is provided to ECU 250.

The autonomous driving sensor is a sensor used for autonomous driving. The autonomous driving sensor, however, may be used for prescribed control while autonomous driving is not being carried out. The autonomous driving sensor includes a sensor that obtains information for recognizing an environment outside AGV 200 and a sensor that obtains information on a position and an attitude of AGV 200. The autonomous driving sensor includes at least one of a camera, a millimeter wave radar, and a lidar. The autonomous driving sensor further includes an inertial measurement unit (IMU) and a global positioning system (GPS) sensor.

AGV 200 is configured to autonomously travel in accordance with a prescribed travel schedule without human intervention. The travel schedule includes, for example, time of departure for a destination and time of arrival at the destination. The travel schedule may be set with any method. For example, a user may operate a user terminal (for example, a mobile terminal) capable of wirelessly communicating with AGV 200 to set a travel schedule and a destination in ECU 250. Alternatively, the user may operate a service tool connected to establish wired communication with AGV 200 or a human machine interface (HMI) of AGV 200 to set a travel schedule and a destination in ECU 250.

ECU 250 is configured to carry out autonomous driving (including autonomous parking) in accordance with a prescribed autonomous driving program. ECU 250 controls an accelerator, a brake, and a steering apparatus (none of which is shown) of AGV 200 based on various types of information obtained by the autonomous driving sensor, to thereby carry out autonomous driving of AGV 200. The autonomous driving program may sequentially be updated by Over the Air (OTA).

Charging circuit 230 is located between battery 210 and power reception coil 220 and controlled by ECU 250. Charging circuit 230 includes a power conversion circuit. When battery 210 is charged with electric power supplied from power transmission coil 120 to power reception coil 220, ECU 250 controls charging circuit 230 such that appropriate electric power is provided from power reception coil 220 to battery 210. Charging circuit 230 converts AC power provided from power reception coil 220 into direct-current (DC) power and provides DC power to battery 210. Specifically, charging circuit 230 may include a resonance circuit (for example, an LC resonance circuit), a filter circuit, and a rectification circuit.

AGV 200 further includes a position sensor module 221 that detects a position of AGV 200 on the mat surface (the main surface of power feed mat 100). Position sensor module 221 is used for alignment between power transmission coil 120 (magnetic marker 121) and power reception coil 220. Position sensor module 221 is provided, for example, on a bottom surface of AGV 200. Position sensor module 221 includes a plurality of magnetic sensors. The plurality of magnetic sensors may be arranged in grids. Each magnetic sensor included in position sensor module 221 detects magnetism emitted from magnetic marker 121. AGV 200 is configured to travel over power feed mat 100 while it aligns power transmission coil 120 and power reception coil 220 with each other based on a result of detection by position sensor module 221.

In this embodiment, power feed mat 100 and AGV 200 are configured to communicate with each other. As communication instrument 141 of power feed mat 100 and wireless communication instrument 240 of AGV 200 wirelessly communicate with each other, information can be exchanged between mat controller 150 and ECU 250. Power feed mat 100 and AGV 200 may communicate with each other in any communication method. Power feed mat 100 and AGV 200 may be configured to establish short-range communication (for example, direct communication within an area around power feed mat 100) such as near field communication (NFC) or Bluetooth®. Power feed mat 100 and AGV 200 may be configured to wirelessly communicate with each other by using a wireless local area network (LAN). AGV 200 may include a radio frequency identification (RFID) apparatus. Then, power feed mat 100 may be configured to receive a signal emitted from the RFID apparatus of AGV 200.

Though the configuration of AGV 200 is described above, each of movable bodies 206 to 208 shown in FIG. 2 also contains a configuration similar to the configuration shown in FIG. 3. The circuit configuration described above may be modified as necessary to perform similar functions.

Figure 4:
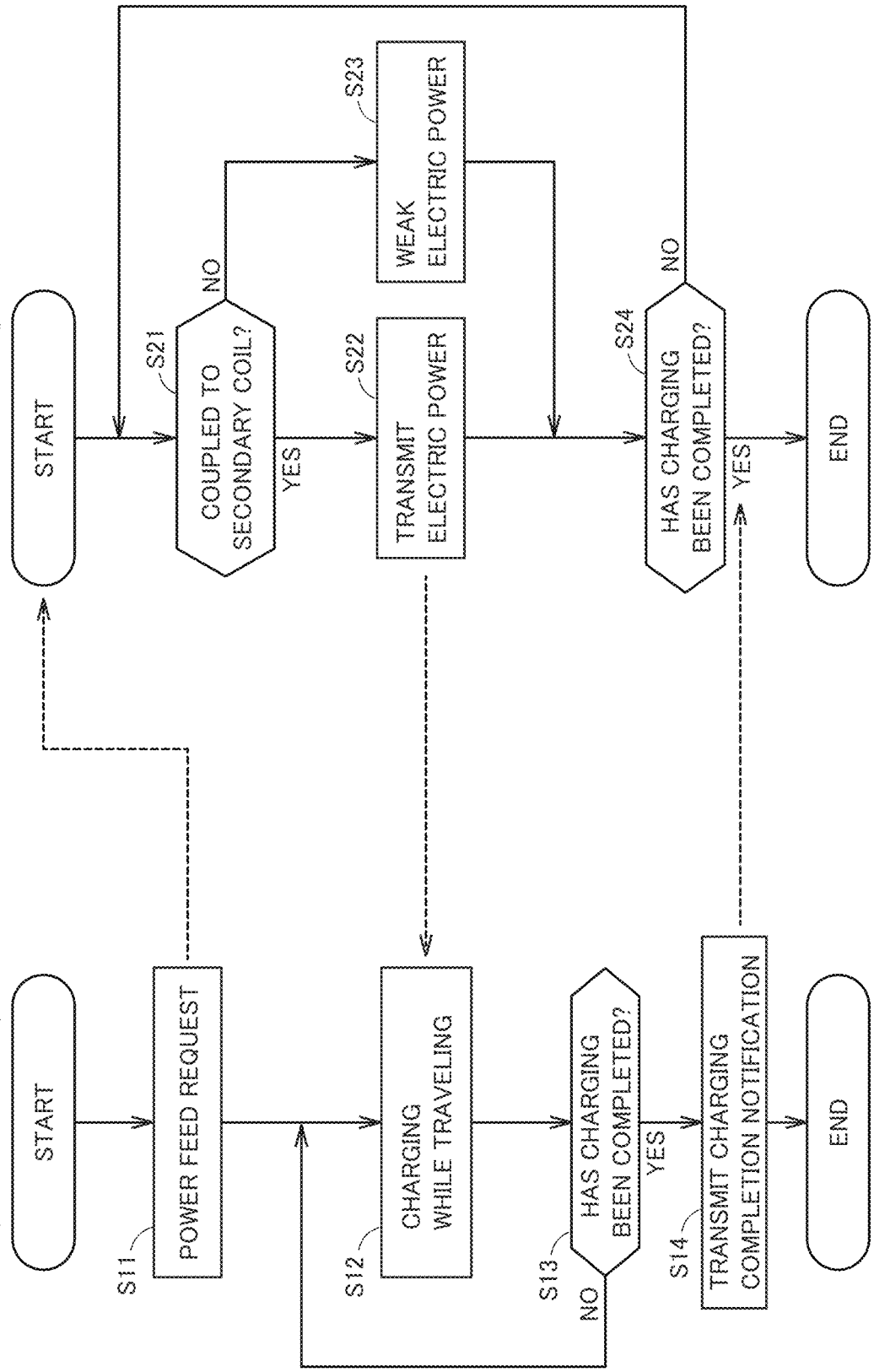
FIG. 4 is a flowchart showing a power feed method according to the embodiment of the present disclosure.

FIG. 4 is a flowchart showing a power feed method according to this embodiment. In this embodiment, when a prescribed charging start condition is satisfied, the movable body starts processing shown in FIG. 4. The prescribed charging start condition is satisfied, for example, when the movable body enters a prescribed area around power feed mat 100. The movable body may recognize that it has entered the prescribed area when communication with power feed mat 100 is established. Alternatively, a geofencing technology may be used for determination as to an area. Each step in the flowchart is simply denoted as "S" below. Though an example in which AGV 200 performs the processing shown in FIG. 4 is described below, another movable body (for example, movable bodies 206 to 208 shown in FIG. 2) also performs the processing shown in FIG. 4.

Referring to FIG. 4 together with FIG. 3, in S11, ECU 250 of AGV 200 transmits a power feed request (a signal requesting power feed) to power feed mat 100.

When power feed mat 100 receives the power feed request from AGV 200 (ECU 250), mat controller 150 starts processing shown in FIG. 4. In S11, information for authentication may be transmitted from the movable body to power feed mat 100. Then, mat controller 150 may start the processing shown in FIG. 4 only for the movable body that has successfully been authenticated.

In S21, mat controller 150 determines whether or not any power transmission coil 120 included in power feed mat 100 has electromagnetically been coupled to power reception coil 220 (secondary coil) of AGV 200. Mat controller 150 may determine whether or not power transmission coil 120 and power reception coil 220 have electromagnetically been coupled to each other based on a coefficient of coupling between power transmission coil 120 and power reception coil 220. Mat controller 150 may determine whether or not any power transmission coil 120 has electromagnetically been coupled to power reception coil 220 of AGV 200 while it has weak electric power supplied to each power transmission coil 120 included in power feed mat 100.

When there is a power transmission coil 120 (which is also referred to as a "coupled coil" below) in power feed mat 100 that is electromagnetically coupled to power reception coil 220, determination as YES is made in S21 and the process proceeds to S22. In S22, mat controller 150 controls power control circuit 130 such that wireless power transmission (WPT) from the coupled coil to power reception coil 220 is carried out. In S22, a voltage for wireless power feed is applied to the coupled coil. When camera 350 detects a prescribed object (for example, a foreign matter such as a metal piece) on power feed mat 100 (particularly, in the vicinity of the coupled coil), WPT (S22) may be prohibited When there is no coupled coil in power feed mat 100, determination as NO is made in S21 and the process proceeds to S23. In S23, mat controller 150 controls power control circuit 130 such that weak electric power is supplied to each power transmission coil 120 included in power feed mat 100.

Mat controller 150 continues processing in S21 to S23 described above until it receives a charging completion notification from AGV 200. In S24, mat controller 150 determines whether or not power feed mat 100 has received the charging completion notification.

In S12, AGV 200 carries out charging while traveling. Specifically, AGV 200 travels over power feed mat 100 while it aligns power transmission coil 120 and power reception coil 220 with each other based on a result of detection by position sensor module 221. AGV 200 is fed with power from power feed mat 100 while traveling. Then, battery 210 is charged with electric power supplied from power transmission coil 120 of power feed mat 100 to power reception coil 220 of AGV 200. Power transmission coil 210 that feeds power to AGV 200 that is traveling changes depending on the position of AGV 200. During charging of battery 210, ECU 250 controls charging circuit 230 to adjust charging power.

AGV 200 continues traveling and charging until a prescribed charging completion condition is satisfied. In S13, ECU 250 determines whether or not the charging completion condition has been satisfied. In this embodiment, the charging completion condition is satisfied when AGV 200 passes over power feed mat 100. When power reception coil 220 is no longer fed with power from power feed mat 100, ECU 250 may determine that AGV 200 has passed over power feed mat 100. When the SOC of battery 210 becomes equal to or larger than a prescribed SOC value (for example, an SOC value indicating full charge) as well, the charging completion condition is satisfied. When the charging completion condition is satisfied (YES in S13), in S14, ECU 250 transmits a charging completion notification to power feed mat 100. Then, when power feed mat 100 receives the charging completion notification (YES in S24), a series of processing shown in FIG. 4 ends.

As described above, power feed mat 100 is configured to wirelessly feed power to a movable body (for example, any of movable bodies 201 to 208 shown in FIG. 2). Such power feed mat 100, however, is more readily removed after placement than the power feed unit of a type buried in the road. Therefore, there is a concern that the power feed mat is blown away by the wind or stolen.

The management system according to this embodiment includes a server 500 which will be described below, in order to easily and appropriately monitor a placed power feed mat.

Figure 5:
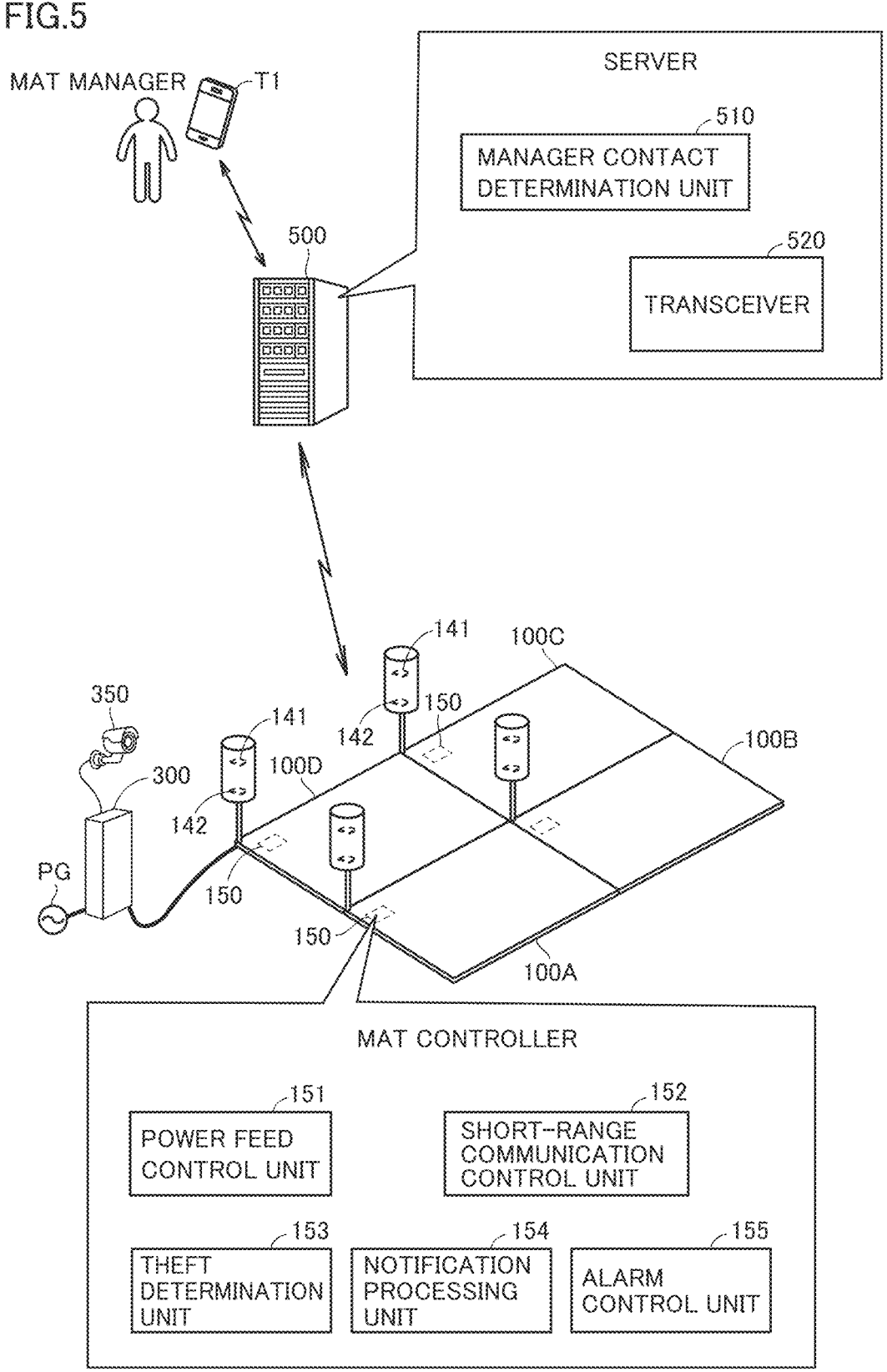
FIG. 5 is a diagram showing a management system according to the embodiment of the present disclosure.

FIG. 5 is a diagram for illustrating a management system according to this embodiment. Referring to FIG. 5 together with FIG. 3, server 500 is configured to communicate with a mobile terminal T1. Mobile terminal T1 is carried by a manager of the power feed mat (which is also referred to as a "mat manager" below). Mobile terminal T1 according to this embodiment corresponds to an exemplary "terminal of the manager of the power feed mat" according to the present disclosure.

Mobile terminal T1 contains a computer. In this embodiment, a smartphone equipped with a touch panel display is adopted as mobile terminal T1. Mobile terminal T1 is configured to wirelessly communicate with server 500. The touch panel display of mobile terminal T1 is configured to give information to the mat manager. Any mobile terminal can be adopted as mobile terminal T1, and a tablet terminal, a wearable device (for example, a smart watch), an electronic key, or a service tool can also be adopted.

The mat manager may manage a rental power feed mat. The mat manager may rent a power feed mat to a specific user and may be paid therefor. The mat manager may place the power feed mat such that a user can use it, and may receive a fee for usage of the power feed mat from the user who uses the power feed mat. The mat manager may rent power feed mats 100A to 100D shown in FIG. 5. For example, each of power feed mats 100A to 100D may be placed at a prescribed location such that the user can use power feed mats 100A to 100D. In the example shown in FIG. 5, power feed mats 100A to 100D are placed adjacently to one another to form a single large power feed mat. Power feed mats 100A to 100D thus placed can be handled as a single large power feed mat. As described previously, however, at least one of the power feed mats (any one of power feed mats 100A to 100D) may be blown away by the wind or stolen.

In this embodiment, power feed mats 100A to 100D placed nearby are handled as one group and each power feed mat belonging to the same group monitors another power feed mat (which is also referred to as a "monitoring target" below) belonging to the same group. The monitoring target is determined for each power feed mat. Each power feed mat successively determines whether or not a monitoring target is present at a prescribed location (which is also referred to as a "power feed location" below). The power feed location of each power feed mat corresponds to a location where the power feed mat is placed. Placed power feed mats 100A to 100D check presence of one another. Therefore, in the event that any one power feed mat leaves the power feed location, leaving of the power feed mat can be detected early. The power feed mat is monitored mainly from a point of view of prevention of theft below. The purpose of monitoring, however, is not limited to prevention of theft. The placed power feed mat may be monitored, for example, for the purpose of checking whether or not there is a power feed mat blown away by the wind.

Server 500 is configured to manage power feed mats 100A to 100D. Each of power feed mats 100A to 100D is configured to wirelessly communicate with server 500. Server 500 can know a state of each of power feed mats 100A to 100D based on information received from each of power feed mats 100A to 100D. Server 500 may be configured to manage not only the group (power feed mats 100A to 100D) but also a plurality of groups.

In this embodiment, each of power feed mats 100A to 100D is the same in configuration as power feed mat 100 shown in FIGS. 1 to 3. How to use power feed mats 100A to 100D is as described previously (see FIGS. 2 to 4). Though FIG. 5 shows only a cable through which power supply module 300 and power feed mat 100D are connected to each other, power supply module 300 is electrically connected to each of power feed mats 100A to 100D through cables. Power supply module 300 may electrically be connected to each of power feed mats 100A to 100C through a cable provided in the inside of sheet substrate 110 (FIG. 3) of power feed mat 100D.

Mat controller 150 includes a power feed control unit 151, a short-range communication control unit 152, a theft determination unit 153, a notification processing unit 154, and an alarm control unit 155. Each unit is implemented, for example, by a processor and a program executed by the processor. Without being limited as such, each unit may be implemented by dedicated hardware (electronic circuitry).

Power feed control unit 151 is configured to control wireless power feed to a movable body (see, for example, FIG. 4).

Short-range communication control unit 152 is configured to establish short-range communication with a prescribed power feed mat (which is also referred to as a "communication target" below) placed near the power feed mat. In the power feed mat placed at the power feed location, short-range communication by short-range communication control unit 152 is continuously carried out. A plurality of placed power feed mats (for example, power feed mats 100A to 100D) communicate with one another. In this embodiment, an adjacent power feed mat is defined as the communication target (a counterpart of short-range communication). Power feed mat 100A establishes short-range communication with power feed mats 100D and 100B, power feed mat 100B establishes short-range communication with power feed mats 100A and 100C, power feed mat 100C establishes short-range communication with power feed mats 100B and 100D, and power feed mat 100D establishes short-range communication with power feed mats 100C and 100A. Each of power feed mats 100A to 100D is configured to continuously communicate with another power feed mat (specifically, an adjacent power feed mat) while it is placed at the power feed location. The communication target is not limited to the adjacent power feed mat but can be changed as appropriate.

Theft determination unit 153 is configured to monitor short-range communication between power feed mats and to determine whether or not the short-range communication between the power feed mats has been lost. Details of a determination method will be described later (see FIG. 6).

Notification processing unit 154 is configured to transmit to server 500, a first signal indicating loss of communication between power feed mats when theft determination unit 153 senses loss of short-range communication between the power feed mats. According to such a configuration, server 500 can be notified that the power feed mat is not present at the power feed location. In this embodiment, a first theft signal which will be described later corresponds to the first signal (see FIG. 6).

Alarm control unit 155 is configured to have alarm device 142 issue an alarm when theft determination unit 153 senses loss of short-range communication between power feed mats. According to such a configuration, theft of the power feed mat can be suppressed.

In this embodiment, mat controller 150 also serves as a "monitoring apparatus" and a "processing apparatus" according to the present disclosure. Theft determination unit 153 functions as the "monitoring apparatus," and each of notification processing unit 154 and alarm control unit 155 functions as the "processing apparatus."

Server 500 includes a manager contact determination unit 510. Server 500 includes a processor, a RAM, and a storage in which a program is stored (none of which is shown), and manager contact determination unit 510 is implemented by the processor and a program executed by the processor. Without being limited as such, manager contact determination unit 510 may be implemented by dedicated hardware (electronic circuitry).

Manager contact determination unit 510 is configured to transmit to mobile terminal T1, a second signal indicating that the power feed mat has left the power feed location when server 500 receives the first signal. In this embodiment, a second theft signal which will be described later corresponds to the second signal (see S42 in FIG. 7).

Server 500 further includes a transceiver 520. Transceiver 520 is configured to communicate with each of power feed mats 100A to 100D. In this embodiment, transceiver 520 wirelessly communicates with each of power feed mats 100A to 100D. Without being limited as such, communication may be wired communication.

Figure 6:
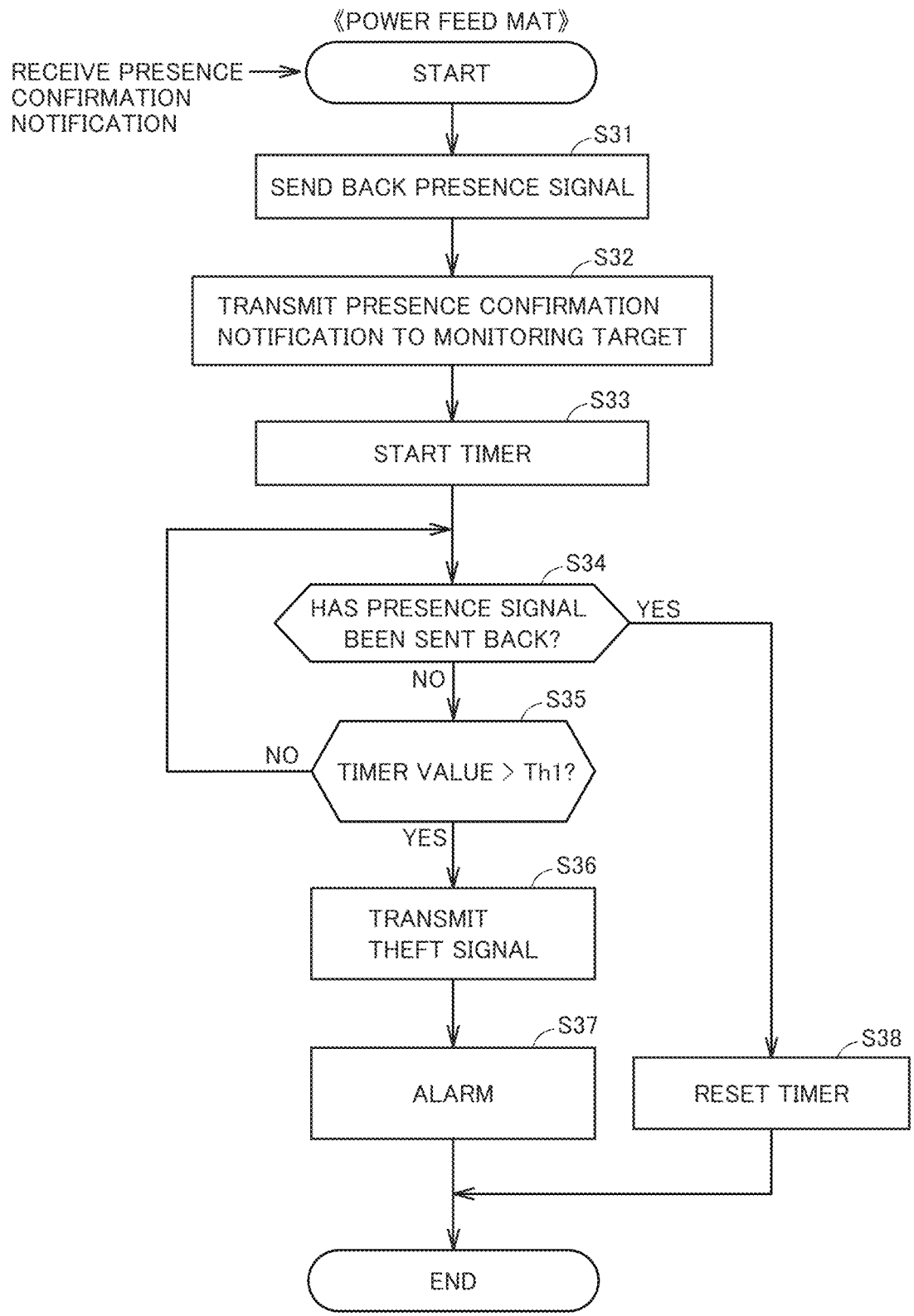
FIG. 6 is a flowchart for illustrating monitoring processing performed by the placed power feed mat in a method of managing the power feed mat according to the embodiment of the present disclosure.

FIG. 6 is a flowchart showing monitoring processing (processing involved with monitoring of the power feed mat) performed by each of placed power feed mats 100A to 100D. The power feed mat that performs the processing shown in FIG. 6 is referred to as a "subject mat" below. The power feed mat that monitors the subject mat is referred to as a "first adjacent mat." The power feed mat monitored by the subject mat is referred to as a "second adjacent mat." For the subject mat, the second adjacent mat corresponds to the monitoring target.

In this embodiment, when power feed mat 100A is defined as the subject mat, power feed mat 100D corresponds to the first adjacent mat and power feed mat 100B corresponds to the second adjacent mat. When power feed mat 100B is defined as the subject mat, power feed mat 100A corresponds to the first adjacent mat and power feed mat 100C corresponds to the second adjacent mat. When power feed mat 100C is defined as the subject mat, power feed mat 100B corresponds to the first adjacent mat and power feed mat 100D corresponds to the second adjacent mat. When power feed mat 100D is defined as the subject mat, power feed mat 100C corresponds to the first adjacent mat and power feed mat 100A corresponds to the second adjacent mat.

When the subject mat receives a presence confirmation notification from the first adjacent mat, it starts a series of processing shown in FIG. 6. The processing shown in FIG. 6 is performed by mat controller 150 of the subject mat.

Referring to FIG. 6, in S31, the subject mat sends a presence signal back to the first adjacent mat. The presence signal is a signal indicating that the subject mat is present at a power feed location (a location of placement). When power feed mat 100A is defined as the subject mat, power feed mat 100A receives the presence confirmation notification from power feed mat 100D and sends the presence signal back to power feed mat 100D. When power feed mat 100A is not present at the power feed location, short-range communication between power feed mat 100A and power feed mat 100D is lost and the presence signal is not sent from power feed mat 100A back to power feed mat 100D.

In following S32, the subject mat transmits the presence confirmation notification to the second adjacent mat. The presence confirmation notification is a notification for confirming presence of the monitoring target. When power feed mat 100A is defined as the subject mat, the presence confirmation notification is transmitted from power feed mat 100A to power feed mat 100B. Unless short-range communication between power feed mat 100A and power feed mat 100B has been lost, power feed mat 100B receives the presence confirmation notification. The monitoring processing (the series of processing shown in FIG. 6) in which power feed mat 100B is defined as the subject mat is started separately from the monitoring processing (the series of processing shown in FIG. 6) in which power feed mat 100A is defined as the subject mat. Such monitoring processing is performed in parallel.

In following S33, theft determination unit 153 of the subject mat starts counting by a timer. This timer counts time elapsed since transmission of the presence confirmation notification to the second adjacent mat by the subject mat.

In following S34, theft determination unit 153 of the subject mat determines whether or not it has received the presence signal from the second adjacent mat. When the subject mat has not received the presence signal from the second adjacent mat (NO in S34), in S35, theft determination unit 153 of the subject mat determines whether or not a timer count value has exceeded a prescribed value (which is denoted as "Th1" below). When the timer count value has not exceeded Th1, determination as NO is made in S35 and the process returns to S34. Th1 is set to allow proper determination as to presence of the second adjacent mat (monitoring target). Th1 may be set to a time period selected from a range not shorter than thirty seconds and not longer than ten minutes. In this embodiment, Th1 is set to five minutes.

When the subject mat receives the presence signal from the second adjacent mat (YES in S34) before the time period elapsed since transmission of the presence confirmation notification to the second adjacent mat by the subject mat exceeds Th1, in S38, theft determination unit 153 of the subject mat resets the timer. The timer thus returns to an initial value (0). Reception by the subject mat, of the presence signal sent back from the second adjacent mat means that short-range communication between the subject mat and the second adjacent mat has not been lost.

When the subject mat does not receive the presence signal sent back from the second adjacent mat even when the timer count value exceeds Th1 (YES in S35), processing in S36 and S37 is performed. Reception by the subject mat, of no presence signal sent back from the second adjacent mat even when the timer count value exceeds Th1 means loss of short-range communication between the subject mat and the second adjacent mat.

In S36, notification processing unit 154 of the subject mat transmits a first theft signal including information (monitoring target ID) for identifying the second adjacent mat to server 500. The first theft signal indicates in which of power feed mats 100A to 100D communication has been lost. For example, when power feed mat 100B is defined as the second adjacent mat, the first theft signal indicates loss of communication in power feed mat 100B. Furthermore, the first theft signal indicates that the second adjacent mat has left the power feed location (for example, the second adjacent mat has been stolen).

In S37, alarm control unit 155 of the subject mat has alarm device 142 issue an alarm. Alarm device 142 thus goes off and sound is emitted from alarm device 142. Alarm device 142 keeps sounding until a prescribed period elapses.

When the processing in S36 and S37 is performed, the series of processing shown in FIG. 6 ends.

Figure 7:
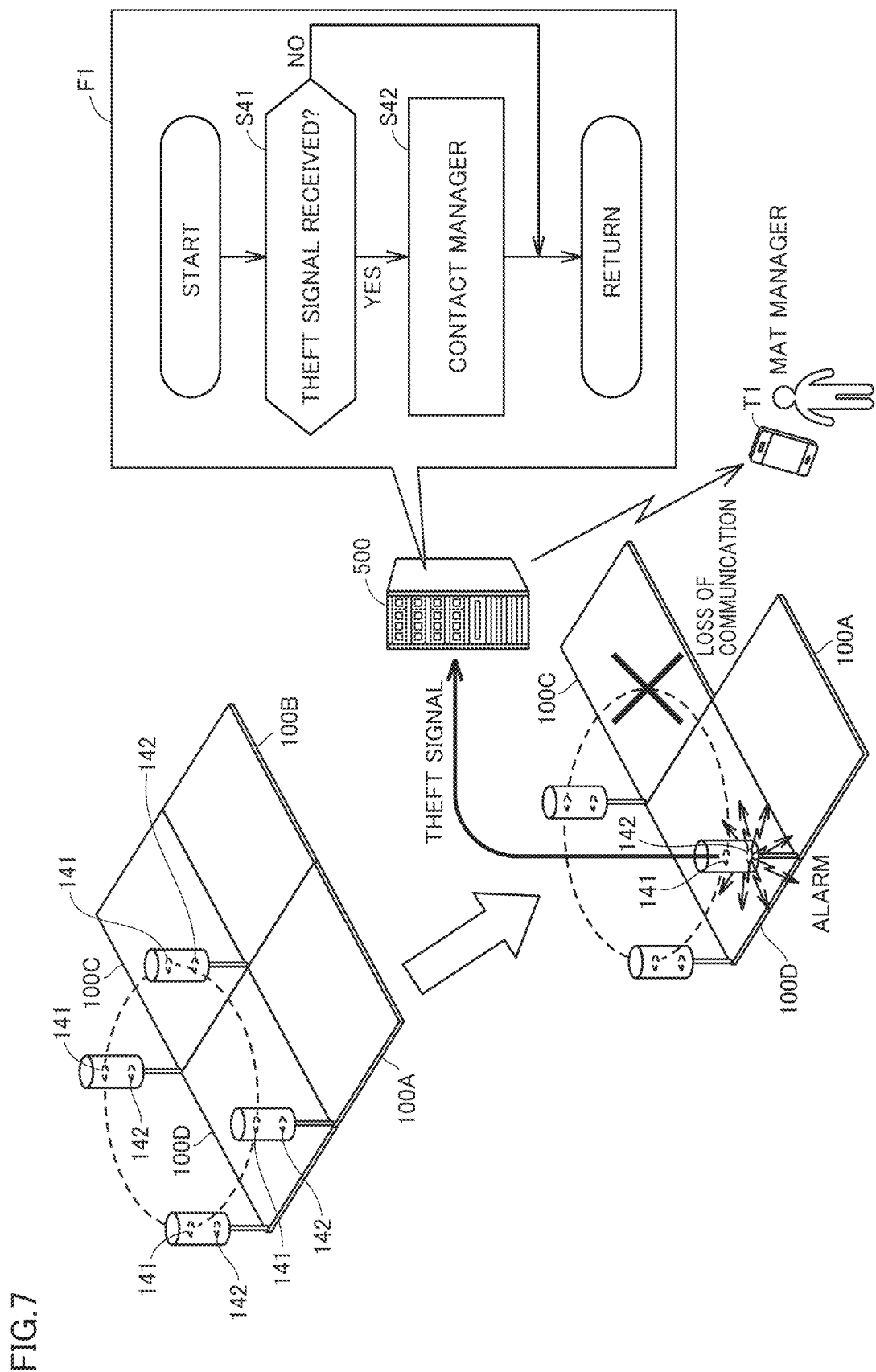
FIG. 7 is a diagram showing processing performed by a server that has received a first theft signal transmitted in the monitoring processing shown in FIG. 6.

FIG. 7 is a diagram showing processing performed by server 500 that has received the first theft signal transmitted in the monitoring processing described above.

Referring to FIG. 7, each of placed power feed mats 100A to 100D performs the processing shown in FIG. 6. When power feed mat 100B is stolen, in the monitoring processing (the series of processing shown in FIG. 6) in which power feed mat 100A is defined as the subject mat, the processing in S36 and S37 is performed as shown below. In S36, power feed mat 100A transmits the first theft signal indicating loss of communication by power feed mat 100B to server 500. In S37, power feed mat 100A issues an alarm. Thus, alarm device 142 of power feed mat 100A emits alarm sound and notifies surroundings of occurrence of theft.

Server 500 is configured to repeatedly perform processing shown in a flowchart F1 in FIG. 7. In S41, server 500 determines whether or not it has received the first theft signal from a power feed mat. While server 500 does not receive the first theft signal, processing in S41 is repeatedly performed. When server 500 receives the first theft signal (YES in S41), in S42, it informs the manager of the power feed mat of absence of the power feed mat at the power feed location. When server 500 receives the first theft signal from any one of power feed mats 100A to 100D, it transmits a second theft signal to mobile terminal T1. The second theft signal indicates that a power feed mat has left the power feed location (for example, the power feed mat has been stolen). Furthermore, the second theft signal includes information for identifying the power feed mat that has left the power feed location. For example, when power feed mat 100B has been stolen, the second theft signal indicates that power feed mat 100B has left the power feed location.

Mobile terminal T1 that has received the second theft signal notifies the mat manager of reception of the second theft signal. Mobile terminal T1 may show such a message as "Whereabouts of power feed mat 100B are unknown. It may have been stolen."

As described above, the management system according to this embodiment is configured to manage power feed mats 100A to 100D that wirelessly feed power to a movable body. Each of power feed mats 100A to 100D is configured to communicate while it is placed at a prescribed location. Each of power feed mats 100A to 100D includes mat controller 150 (theft determination unit 153, notification processing unit 154, and alarm control unit 155) that functions as the monitoring apparatus and the processing apparatus which will be described below.

The monitoring apparatus is configured to monitor communication by the power feed mat. The processing apparatus is configured to perform prescribed processing when the monitoring apparatus senses loss of communication by the power feed mat.

In mat controller 150, theft determination unit 153 determines whether or not the power feed mat is present at the power feed location based on whether or not communication by the power feed mat has been lost (S34 and S35 in FIG. 6). When the power feed mat has left the power feed location, notification processing unit 154 notifies the mat manager of leaving of the power feed mat through server 500, and alarm control unit 155 has an alarm issued (S36 and S37 in FIG. 6). According to such a management system, the placed power feed mat can readily and appropriately be monitored.

A method of managing a power feed mat according to this embodiment includes monitoring communication by a power feed mat that wirelessly feeds power to a movable body (S34 and S35 in FIG. 6) and performing prescribed processing when communication by the power feed mat has been lost (S36 and S37 in FIG. 6). According to such a method of managing the power feed mat, the placed power feed mat can easily and appropriately be monitored.

Figure 8:
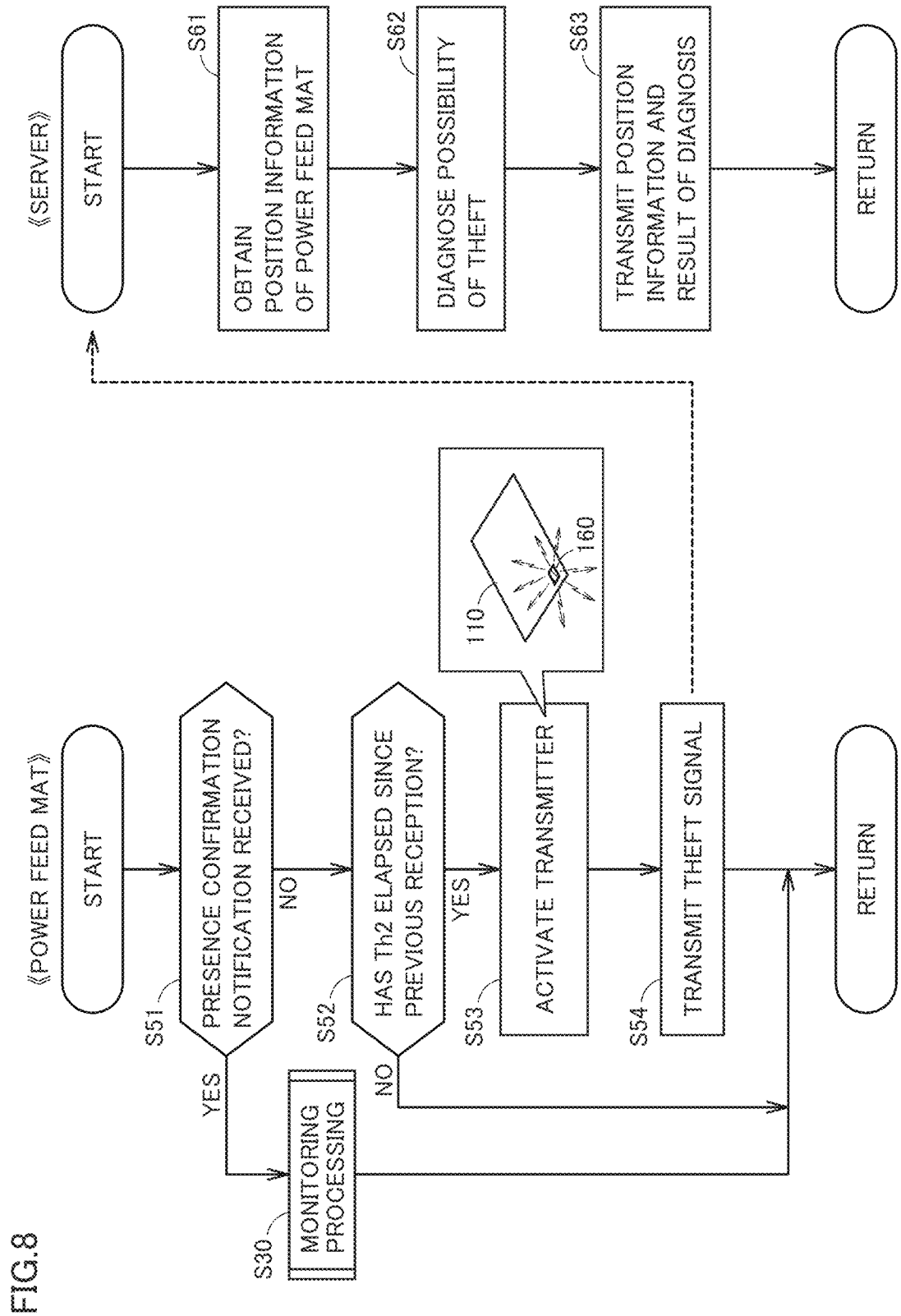
FIG. 8 is a flowchart showing processing performed by the power feed mat in a modification.

In the processing shown in FIG. 6, the subject mat monitors whether or not the second adjacent mat (monitoring target) is present. Without being limited as such, the subject mat may monitor whether or not the subject mat itself is present (whether or not the subject mat is present) in addition to whether or not the monitoring target is present. FIG. 8 is a flowchart showing processing performed by each of power feed mats 100A to 100D in a modification. In this modification, each of power feed mats 100A to 100D repeatedly performs processing shown in FIG. 8 which will be described below while it is placed at a power feed location. In this modification, each of power feed mats 100A to 100D includes a transmitter (for example, a transmitter 160 shown in FIG. 8) that emits a position signal indicating a position of the power feed mat. Processing shown in FIG. 8 is performed by mat controller 150 of the subject mat.

Referring to FIG. 8 together with FIG. 5, in S51, the subject mat determines whether or not it has received the presence confirmation notification from the first adjacent mat. When the subject mat has received the presence confirmation notification from the first adjacent mat (YES in S51), in S30, it performs the series of processing shown in FIG. 6. This flow is the same as in the embodiment.

In this modification, however, while the subject mat does not receive the presence confirmation notification from the first adjacent mat (NO in S51), processing in S52 is performed. In S52, mat controller 150 of the subject mat determines whether or not a prescribed time period (which is denoted as "Th2" below) has elapsed since reception of a most recent presence confirmation notification (previous presence confirmation notification) by the subject mat. Th2 is set to allow proper determination as to whether or not the subject mat is present. Th2 may be set to a time period selected from a range not shorter than thirty seconds and not longer than ten minutes.

When the subject mat does not receive a next presence confirmation notification (present presence confirmation notification) even after lapse of Th2 or longer since reception of the previous presence confirmation notification (YES in S52), processing in S53 and S54 which will be described below is performed. Not receiving the present presence confirmation notification by the subject mat even after lapse of Th2 or longer since reception of the previous presence confirmation notification means loss of short-range communication between the subject mat and the first adjacent mat. Mat controller 150 of the subject mat may be configured to operate, when the subject mat is disconnected from power supply module 300, only for a prescribed period owing to a backup power supply mounted on the subject mat. Alternatively, determination as YES may be made in S52 when mat controller 150 of the subject mat enters a power failure state without normal quitting processing being performed.

In S53, mat controller 150 of the subject mat activates transmitter 160 contained in sheet substrate 110 of the subject mat. Transmitter 160 is, for example, a GPS tracker. Transmitter 160 is normally inactive (off). When transmitter 160 is activated (turned on) in processing in S53, it starts emission of a position signal indicating a position of the subject mat. Each of power feed mats 100A to 100D may include a power storage for transmitter 160. Alternatively, electric power may be supplied from a not-shown backup power supply to transmitter 160.

In S54, mat controller 150 of the subject mat is configured to transmit a third theft signal including information (subject mat ID) for identifying the subject mat to server 500. The third theft signal indicates loss of communication by the subject mat.

When power feed mat 100A among power feed mats 100A to 100D is stolen, in spite of transmission of the presence confirmation notification from power feed mat 100D to power feed mat 100A, the presence confirmation notification does not arrive at power feed mat 100A. Therefore, in processing in which power feed mat 100A is defined as the subject mat (the series of processing shown in FIG. 8), transmitter 160 of power feed mat 100A is activated in the processing in S53. On the other hand, power feed mat 100B no longer receives the presence confirmation notification from power feed mat 100A. Therefore, in the processing in which power feed mat 100B is defined as the subject mat (the series of processing shown in FIG. 8), transmitter 160 of power feed mat 100B is activated in the processing in S53.

When server 500 receives the third theft signal (S54), it starts the processing shown in FIG. 8. In S61, server 500 obtains the position signal (position information of each power feed mat) emitted from transmitter 160 of each power feed mat. In succession, in S62, server 500 diagnoses possibility of theft of each power feed mat based on the position information of each power feed mat obtained in S61. Specifically, server 500 may diagnose possibility of theft of each power feed mat based on a behavior of each power feed mat. For example, when the position of the power feed mat is distant from the power feed location or the power feed mat is moving in a direction away from the power feed location, the power feed mat is highly likely to have been stolen. Alternatively, when the power feed mat stays around the power feed location, the power feed mat is highly likely to have been blown away by the wind.

In following S63, server 500 transmits to mobile terminal T1, identification information and position information of the power feed mat diagnosed in S62 as being highly likely to have been stolen. Furthermore, server 500 may find a distance between the power feed mat diagnosed as being highly likely to have been stolen and the power feed location based on the position signal (position information) emitted from transmitter 160 of the power feed mat, and transmit the obtained distance to mobile terminal T1.

Server 500 repeatedly performs the processing in S61 to S63 while it receives the position signal (position information) emitted from transmitter 160. Server 500 can obtain a path of movement of the power feed mat by continuously receiving the position information of the power feed mat from transmitter 160. In the processing in S63, the position of the power feed mat is successively transmitted in real time to mobile terminal T1. According to the processing shown in FIG. 8, the stolen power feed mat can be tracked. By tracking the stolen power feed mat, retrieval of the stolen power feed mat is facilitated.

In the example shown in FIG. 5, the number of power feed mats belonging to one group is set to four. Without being limited as such, the number of power feed mats belonging to one group may be set to two or three, or five or more.

In the example shown in FIG. 5, power feed mats 100A to 100D belonging to the same group are adjacently arranged. It is not essential, however, that power feed mats 100A to 100D belonging to the same group are in contact with one another, but power feed mats 100A to 100D may be arranged at a distance from one another.

The communication target and the monitoring target within a group can be changed as appropriate. In the embodiment, each power feed mat is configured to monitor one adjacent power feed mat. Without being limited as such, each power feed mat may be configured to monitor a plurality of power feed mats. For example, each of a plurality of power feed mats placed to form one group may set all other power feed mats belonging to the same group as communication targets and monitoring targets. Specifically, in the example shown in FIG. 5, power feed mat 100A may be configured to monitor each of power feed mats 100B to 100D.

In the embodiment, mat controller 150 functions as the monitoring apparatus and the processing apparatus. In other words, each of the monitoring apparatus and the processing apparatus is arranged in the power feed mat. Without being limited as such, each of the monitoring apparatus and the processing apparatus may be arranged on the outside of the power feed mat (for example, in the vicinity of the power feed mat).

In the embodiment, communication between power feed mats within a group is monitored, and when this communication is lost, determination that a power feed mat has left a power feed location is made. Without being limited as such, communication between a communication apparatus provided on the outside of the power feed mat and a power feed mat may be monitored, and when this communication is lost, determination that the power feed mat has left the power feed location may be made.

Figure 9:
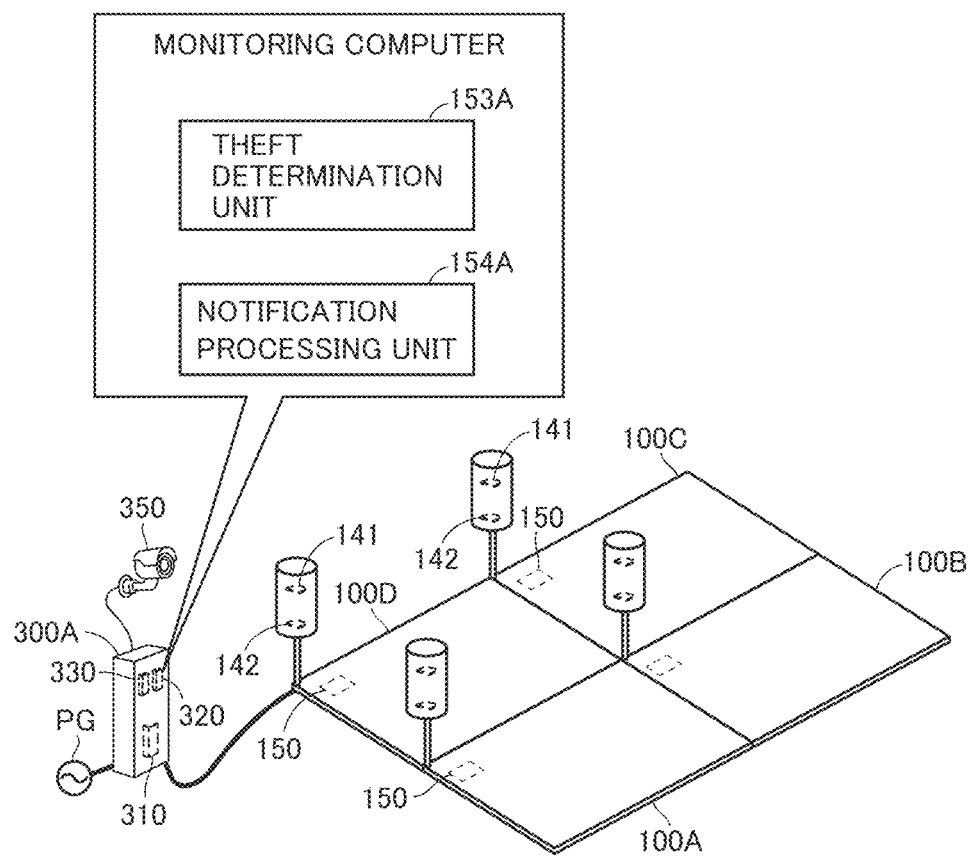
FIG. 9 is a diagram showing the management system according to a first modification.

FIG. 9 is a diagram showing the management system according to a first modification. Referring to FIG. 9, the management system according to the first modification includes a power supply module 300A. Power supply module 300A is configured basically similarly to power supply module 300 shown in FIG. 3. Power supply module 300A, however, contains a monitoring computer 320 and a communication apparatus 330 in addition to power supply circuit 310. Communication apparatus 330 is configured to communicate with each of power feed mats 100A to 100D placed at a power feed location. Monitoring computer 320 functions as the monitoring apparatus and the processing apparatus.

Monitoring computer 320 includes a theft determination unit 153A and a notification processing unit 154A. Theft determination unit 153A is configured to monitor communication between each of power feed mats 100A to 100D and communication apparatus 330. Notification processing unit 154A is configured to transmit to server 500, when theft determination unit 153A senses loss of communication between any one of power feed mats 100A to 100D and communication apparatus 330, a signal indicating loss of communication by a power feed mat (a fourth theft signal which will be described later).

In the management system according to the first modification, mat controller 150 of each of power feed mats 100A to 100D performs processing shown in FIG. 10 which will be described below, instead of the processing shown in FIG. 6. FIG. 10 is a flowchart showing processing performed instead of the processing shown in FIG. 6, in the management system according to the first modification. The processing shown in this flowchart is repeatedly performed in prescribed cycles.

Referring to FIG. 10, in S71, monitoring computer 320 transmits the presence confirmation notification to each of power feed mats 100A to 100D. In following S72, monitoring computer 320 starts counting by the timer. This timer counts time elapsed since transmission of the presence confirmation notification by monitoring computer 320. In following S73, monitoring computer 320 determines whether or not it has received the presence signal from any one of power feed mats 100A to 100D. When monitoring computer 320 has received the presence signal from any one of power feed mats 100A to 100D (YES in S73), in S74, monitoring computer 320 determines whether or not it has received presence signals from all of power feed mats 100A to 100D. When monitoring computer 320 has not received the presence signal from at least one of power feed mats 100A to 100D (NO in S74), in S75, monitoring computer 320 determines whether or not a timer count value has exceeded a prescribed value (which is denoted as "Th3" below). When the timer count value has not exceeded Th3, determination as NO is made in S75 and the process returns to S73. Th3 is set to allow proper determination as to whether or not each power feed mat is present. Th3 may be set to a time period selected from a range not shorter than thirty seconds and not longer than ten minutes.

In S81, mat controller 150 of each of power feed mats 100A to 100D determines whether or not it has received the presence confirmation notification from power supply module 300A, and when mat controller 150 has received the presence confirmation notification (YES in S81), in S82, it sends the presence signal back to power supply module 300A. Since the power feed mat that has left the power feed location no longer receives the presence confirmation notification from power supply module 300A, it does not send the presence signal back to power supply module 300A.

When power supply module 300A has received the presence signals from all power feed mats before the timer count value exceeds Th3 (YES in S74), in S78, monitoring computer 320 resets the timer. The timer thus returns to the initial value (0).

When there is a power feed mat that does not send the presence signal back even when the timer count value exceeds Th3 (YES in S75), in S76, monitoring computer 320 specifies the power feed mat that does not send the presence signal back, and in S77, monitoring computer 320 transmits to server 500, a fourth theft signal including identification information of the power feed mat that does not send the presence signal back. Server 500 that has received the fourth theft signal transmits a fifth theft signal to mobile terminal T1 in processing in S42 in FIG. 7. Mobile terminal T1 that has received the fifth theft signal notifies the mat manager that the power feed mat (more specifically, the power feed mat that does not send the presence signal back) is no longer present at the power feed location.

The management system according to a second modification will now be described. In the management system according to the second modification, server 500 performs functions of theft determination unit 153A (the monitoring apparatus) and notification processing unit 154A (processing apparatus) described above. Server 500 performs processing shown in FIG. 11 (S71 to S76, S77A, and S78) which will be described below.

FIG. 11 is a flowchart showing processing performed instead of the processing shown in FIGS. 6 and 7, in the management system according to the second modification. Though the processing shown in FIG. 11 is basically the same as the processing shown in FIG. 10, it includes S77A instead of S77. In S77A, server 500 transmits to mobile terminal T1, a sixth theft signal including identification information of a power feed mat that does not send the presence signal back.

Communication monitored with the method shown FIG. 10 or 11 described above is not communication between power feed mats but communication between a power feed mat and power supply module 300A or server 500. Therefore, according to the method, not only the power feed mats are monitored for each group but also the power feed mats can individually be monitored. Power supply module 300A or server 500 may monitor a single power feed mat. Power supply module 300A may include an alarm device and may have the alarm device issue an alarm after S77 in FIG. 10.

A movable body to which the power feed mat is applied is not limited to the vehicle shown in FIGS. 2 and 3. The movable body is not limited to the BEV without including an internal combustion engine but may be a plug-in hybrid electric vehicle (PHEV) including an internal combustion engine. The movable body may carry out charging while parking rather than charging while traveling. The movable body may be an agricultural machine, a walking robot, a drone, a robot cleaner, or a spacecraft, or a rail vehicle, a ship, or an airplane.

Various modifications may be carried out as freely being combined.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A management system, comprising:
a plurality of power feed mats, wherein
each of the plurality of power feed mats is configured to wirelessly feed power to a movable body,
the plurality of power feed mats is configured to communicate among the plurality of power feed mats while the plurality of power feed mats is placed at a prescribed location,
each of the plurality of power feed mats includes a controller,
the plurality of power feed mats includes:
a subject mat;
a first adjacent mat configured to monitor the subject mat; and
a second adjacent mat configured to be monitored by the subject mat,
the subject mat is configured to,
in response to receiving a presence confirmation notification from the first adjacent mat while being present at the prescribed location, send a presence signal back to the first adjacent mat, the presence signal being a signal indicating that the subject mat is present at the prescribed location, in response to receiving the presence confirmation notification from the first adjacent mat while being not present at the prescribed location, not send the presence signal back to the first adjacent mat, transmit a presence confirmation notification to the second adjacent mat, and in response to not receiving the presence signal from the second adjacent mat even when a time elapsed since transmission of the presence confirmation notification to the second adjacent mat by the subject mat has exceeded a prescribed value, perform, through the controller, prescribed processing, and the plurality of power feed mats includes
a first power feed mat,
a second power feed mat,
a third power feed mat, and
a fourth power feed mat, in response to the first power feed mat operating as the subject mat,
the fourth power feed mat operates as the first adjacent mat, and
the second power feed mat operates as the second adjacent mat, in response to the second power feed mat operating as the subject mat,
the first power feed mat operates as the first adjacent mat, and
the third power feed mat operate as the second adjacent mat, in response to the third power feed mat operating as the subject mat,
the second power feed mat operates as the first adjacent mat, and
the fourth power feed mat operates as the second adjacent mat, and in response to the fourth power feed mat operating as the subject mat,
the third power feed mat operates as the first adjacent mat, and
the first power feed mat operates as the second adjacent mat.

2. The management system according to claim 1, wherein the prescribed processing includes transmission by the subject mat, of a signal indicating loss of communication.

3. The management system according to claim 1, wherein each of the plurality of power feed mats includes an alarm device, wherein
the prescribed processing includes processing to issue an alarm by the alarm device.

4. The management system according to claim 1, wherein each of the plurality of power feed mats includes a transmitter configured to emit a position signal indicating a position of a corresponding power feed mat of the plurality of power feed mats, and
the prescribed processing includes processing to start emission of the position signal by the transmitter.

5. The management system according to claim 1, further comprising:
a server configured to communicate with a terminal of a manager of the plurality of power feed mats, wherein
the subject mat is configured to, in response to the controller of the subject mat sensing loss of communication, transmit a first signal to the server, and the server is configured to, in response to the server receiving the first signal, transmit to the terminal, a second signal indicating the power feed mat having left the prescribed location.

6. The management system according to claim 1, wherein the subject mat is configured to, in response to the controller of the subject mat sensing loss of communication by any one of the plurality of power feed mats, transmit a signal indicating in which of the plurality of power feed mats communication has been lost.

7. The management system according to claim 1, wherein each of the plurality of power feed mats is flexible to such an extent as being rolled into a cylinder.

8. The management system according to claim 1, wherein each of the plurality of power feed mats is a rental power feed mat.

9. A management system, comprising:
a plurality of power feed mats, wherein each of the plurality of power feed mats includes a plurality of power transmission coils; and
a power supply module including
a power supply circuit configured to supply electric power to each of the plurality of power transmission coils included in the plurality of power feed mats,
a communication apparatus configured to communicate with each of the plurality of power feed mats placed at a prescribed location, and
a monitoring computer configured to
transmit a presence confirmation notification to each of the plurality of power feed mats, and
in response to the monitoring computer not receiving a presence signal sent back from at least one of the plurality of power feed mats even when a time elapsed since transmission of the presence confirmation notification has exceeded a prescribed value, perform prescribed processing, the presence signal being a signal indicating that said at least one of the plurality of mats is present at the prescribed location, wherein
the plurality of power feed mats includes:
a subject mat;
a first adjacent mat configured to monitor the subject mat; and
a second adjacent mat configured to be monitored by the subject mat,
the subject mat is configured to,
in response to receiving a presence confirmation notification from the first adjacent mat while being present at the prescribed location, send a further presence signal back to the first adjacent mat, the further presence signal being a signal indicating that the subject mat is present at the prescribed location,
in response to receiving the presence confirmation notification from the first adjacent mat while being not present at the prescribed location, not send the further presence signal back to the first adjacent mat,
transmit a presence confirmation notification to the second adjacent mat, and
in response to not receiving the further presence signal from the second adjacent mat even when a time elapsed since transmission of the presence confirmation notification to the second adjacent mat by the subject mat has exceeded a prescribed value, perform, through the controller, further prescribed processing,
the plurality of power feed mats includes
a first power feed mat, a second power feed mat,
a third power feed mat, and
a fourth power feed mat,
in response to the first power feed mat operating as the subject mat,
the fourth power feed mat operates as the first adjacent mat, and
the second power feed mat operates as the second adjacent mat,
in response to the second power feed mat operating as the subject mat,
the first power feed mat operates as the first adjacent mat, and
the third power feed mat operate as the second adjacent mat,
in response to the third power feed mat operating as the subject mat,
the second power feed mat operates as the first adjacent mat, and
the fourth power feed mat operates as the second adjacent mat, and
in response to the fourth power feed mat operating as the subject mat,
the third power feed mat operates as the first adjacent mat, and
the first power feed mat operates as the second adjacent mat.

10. The management system according to claim 9, wherein
the prescribed processing includes:
specifying said at least one of the plurality of power feed mats that does not send the presence signal back; and
transmitting a signal including identification information of the specified said at least one of the plurality of power feed mats.

11. The management system according to claim 9, wherein
the power supply module further includes an alarm device, and
the prescribed processing includes processing to issue an alarm by the alarm device.

12. The management system according to claim 2, further comprising:
a server configured to
communicate with a terminal of a manager of the plurality of power feed mats, and
in response to the server receiving the signal indicating the loss of communication, transmit to the terminal, a further signal indicating the power feed mat having left the prescribed location.

13. The management system according to claim 12, wherein
each of the plurality of power feed mats includes an alarm device, wherein
the prescribed processing includes processing to issue an alarm by the alarm device.

14. The management system according to claim 13, wherein
each of the plurality of power feed mats includes a transmitter configured to emit a position signal indicating a position of a corresponding power feed mat of the plurality of power feed mats, and
the prescribed processing includes processing to start emission of the position signal by the transmitter.

* * * * *